(12) United States Patent
Jirak et al.

(10) Patent No.: US 11,537,366 B1
(45) Date of Patent: Dec. 27, 2022

(54) USER INTERFACE CREATION SYSTEM

(71) Applicant: SAS Institute Inc., Cary, NC (US)

(72) Inventors: Karen Christine Jirak, Cary, NC (US); Edward Fredrick Matthews, II, Apex, NC (US); James Chunan Yang, Apex, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/721,427

(22) Filed: Apr. 15, 2022

Related U.S. Application Data

(60) Provisional application No. 63/235,126, filed on Aug. 19, 2021, provisional application No. 63/254,977, filed on Oct. 12, 2021.

(51) Int. Cl.
*G06F 8/38* (2018.01)
*G06F 8/36* (2018.01)

(52) U.S. Cl.
CPC .... *G06F 8/38* (2013.01); *G06F 8/36* (2013.01)

(58) Field of Classification Search
CPC ............................................................ G06F 8/38
See application file for complete search history.

(56) References Cited

U.S. PATENT DOCUMENTS

| | | | |
|---|---|---|---|
| 9,753,898 B1 * | 9/2017 | Glommen et al. | G06F 17/21 |
| 2004/0001092 A1 * | 1/2004 | Rothwein et al. | G09G 5/00 |
| 2011/0214078 A1 * | 9/2011 | Klask et al. | G06F 3/048 |
| 2020/0042648 A1 * | 2/2020 | Rao | G06F 17/30867 |
| 2020/0097161 A1 * | 3/2020 | Gonzalez et al. | G06F 3/04847 |

OTHER PUBLICATIONS

Angular—Cheat Sheet, https://angular.io/guide/cheatsheet, version 13.3.9, printed Jan. 7, 2022.
Angular—CLI Overview and Command Reference, https://angular.io/cli, version 13.3.9, Google 2010-2022, printed Jan. 7, 2022.
Angular (web framework)—Wikipedia, https://en.wikipedia.org/wiki/Angular (web framework), last edited Jan. 10, 2022.
Angular—explore Angular Resources, https://angular.io/resources?category=development, printed Jan. 7, 2022.
Angular—The modern webdeveloper's platform, https://angular.io, printed Jan. 7, 2022, verion 13.3.9, Google 2010-2022.
API Documentation—the Dojo tooklit Version 1.10; https://dojotoolkit.org/api/ printed Feb. 24, 2022.

(Continued)

*Primary Examiner* — James J Debrow
(74) *Attorney, Agent, or Firm* — Bell & Manning, LLC

(57) ABSTRACT

A computing device create a user interface application. A user interface (UI) tag is read in a UI application. The UI tag is executed to identify a UI template tag. The identified UI template tag is executed to define a top-level container initializer for the UI application and to define a plurality of widget initializers for inclusion in a top-level container rendered using the top-level container initializer. The top-level container is rendered in a display using the top-level container initializer. Each widget of a plurality of widgets in the rendered top-level container is rendered using the defined plurality of widget initializers to create a UI.

30 Claims, 6 Drawing Sheets

(56) References Cited

OTHER PUBLICATIONS

JavaScript—Wikipedia, https://en.wikipedia.org/wiki/JavaScript, last edited Jan. 8, 2022.
JavaScript.com, Celebrating 25 years of JavaScript, 2016-2022 JavaScript.com.
JQuery—Wikipedia; https://en.wikipedia.org/wiki/JQuery, last edited on Jan. 3, 2022.
JQuery Grid—Advanced Javascript Grid for modern HTML5 Apps_, Javascript/jQuery UI Widgets, https://www.jqwidgets.com/jquery-widgets-demo/demos/jpxgrid/index.htm, jQwidgets 2011-2022, printed Feb. 24, 2022.
JQuery, copyright 2022 Open JS Foundation (https://openjsf.org/).
Kendo UI for Angular, the most complete Angular component Liorary, https://www.telerik.com/kendo-angular-ui, printed Jan. 22, 2022.
React—A JavaScript library for building user interfaces, https://reactjs.org, printed Jan. 22, 2022.
React (JavaScript library)—Wikipedia; https://en.wikipedia.org/wiki/React (JavaScript library), last Edited Jan. 11, 2022, printed Jan. 12, 2022.
Web framework—Wikipedia. https:/en.wikipedia.org/wiki/Web_framework, last edited Jan. 6, 2022, printed Jan. 10, 2022.
Gil Fink, "Wrapping React Components Inside Custom Elements," https://gilfinkmedium.com/wrapping-react-components-inside-custom-elements-97431d1155bf, Jun. 16, 2019.

* cited by examiner

USER INTERFACE CREATION SYSTEM

CROSS-REFERENCE TO RELATED APPLICATIONS

The present application claims the benefit of and priority under 35 U.S.C. § 119(e) to U.S. Provisional Patent Application No. 63/235,126 filed on Aug. 19, 2021, and to U.S. Provisional Patent Application No. 63/254,977 filed on Oct. 12, 2021, the entire contents of which are hereby incorporated by reference.

BACKGROUND

User interface (UI) development may rely on a framework and associated widget library developed by various entities that provide specific UI functionality. However, when the framework or widget library is later changed, the entire user interface software may need to be re-written to accommodate the change because the code that implements the logic associated with the UI is intertwined with the framework and associated widget library.

SUMMARY

In an example embodiment, a non-transitory computer-readable medium is provided having stored thereon computer-readable instructions that, when executed by a computing device, cause the computing device to create a user interface (UI). A user interface (UI) tag is read in a UI application. The UI tag is executed to identify a UI template tag. The identified UI template tag is executed to define a top-level container initializer for the UI application and to define a plurality of widget initializers for inclusion in a top-level container rendered using the top-level container initializer. The top-level container is rendered in a display using the top-level container initializer. Each widget of a plurality of widgets in the rendered top-level container is rendered using the defined plurality of widget initializers to create a UI.

In yet another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to create the UI.

In an example embodiment, a method of creating the UI is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

A user interface (UI) application 122 is created by compilation of UI logic components 124, an agnostic widget library 126, and one or more widget libraries 128. A logic that describes a UI functionality is encapsulated in UI logic components 124 that are agnostic to specific widget implementations defined by the one or more widget libraries 128 through inclusion of agnostic widget library 126. Agnostic widget library 126 and the one or more widget libraries 128 may be incorporated using shared libraries imported into UI logic components 124 as part of compilation to create UI application 122. Agnostic widget library 126 recursively defines each widget defined by UI logic components 124 when UI application 122 is compiled so that each widget is initialized and updated when UI application 122 is executed.

Use of agnostic widget library 126 supports:
  reuse of UI logic components 124 with different widget libraries included in the one or more widget libraries 128 including newly incorporated widget libraries with minimal or no code changes to UI logic components 124;
  inclusion of new or modified logic in UI logic components 124 that describes the UI functionality with minimal modification, if any, to agnostic widget library 126 or the one or more widget libraries 128;
  development of UI logic components 124 by developers without knowledge of the one or more widget libraries 128 that define specific widget implementations;
  inclusion of UI components in UI logic components 124 based on functionality provided by more than one of the one or more widget libraries 128;
  consistency in UI rendering by encapsulating the rendering details in agnostic widget library 126 and the one or more widget libraries 128; and
  extensible to include custom widgets in agnostic widget library 126.

Figure 1:
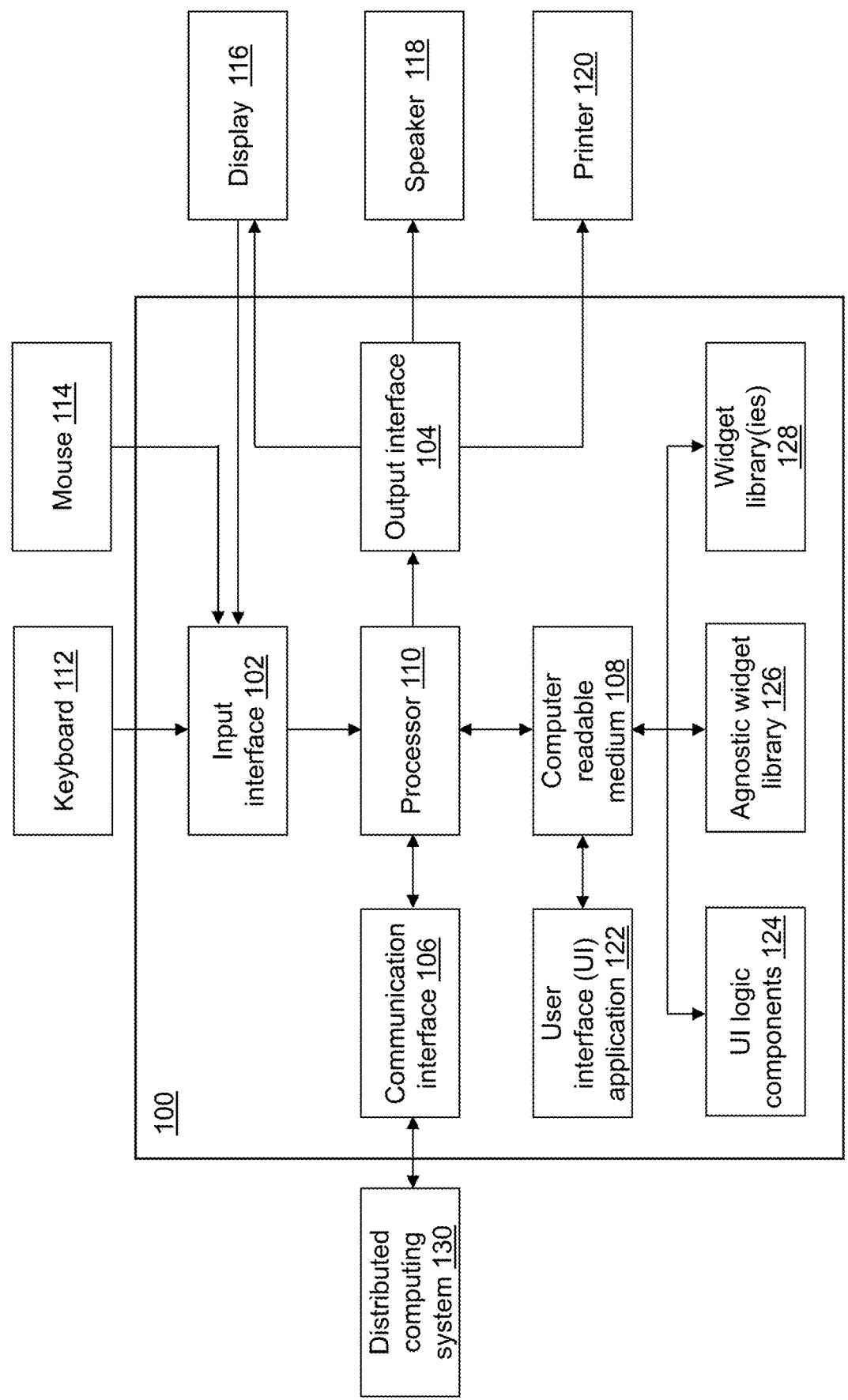
FIG. 1 depicts a block diagram of a UI creation device in accordance with an illustrative embodiment.

Referring to FIG. 1, a block diagram of a UI creation device 100 is shown in accordance with an illustrative embodiment. UI creation device 100 may include an input interface 102, an output interface 104, a communication interface 106, a non-transitory computer-readable medium 108, a processor 110, UI application 122, UI logic components 124, agnostic widget library 126, and the one or more widget libraries 128. Fewer, different, and/or additional components may be incorporated into UI creation device 100.

UI application 122, UI logic components 124, agnostic widget library 126, and the one or more widget libraries 128 are implemented in software comprised of computer-readable and/or computer-executable instructions that are stored in computer-readable medium 108 and accessible by processor 110 for execution of the instructions that embody the operations of UI application 122, UI logic components 124, agnostic widget library 126, and the one or more widget libraries 128. UI application 122, UI logic components 124, agnostic widget library 126, and the one or more widget libraries 128 may be written using one or more programming languages, assembly languages, scripting languages, etc.

UI logic components 124, agnostic widget library 126, and the one or more widget libraries 128 may perform operations associated with creating UI application 122, where UI application 122 may be a Web application executed using a browser application. Illustrative browser applications include Microsoft Edge®, Google Chrome®, Mozilla Firefox®, etc. For example, UI application 122 may use hypertext markup language (HTML) documents and JavaScript®. UI application 122 may be a single-page application that only refreshes part of a page. UI logic components 124, agnostic widget library 126, and the one or more widget libraries 128 may use a framework to organize the software used to create UI application 122.

A widget provides a single interaction point for direct manipulation of a given kind of data and acts as a basic visual building block that holds the data processed by UI application 122 and that defines the available interactions on the data. A widget can contain additional widgets. UI widgets are graphical elements used to build a human-machine-interface of a program. UI widgets are implemented like software components and are included in various software libraries so that developers can use them to build their programs with a UI. Each widget type in agnostic widget library 126 is defined as a class based on object-oriented programming where each type may inherit properties from other classes.

A widget library includes a set of functions and/or HTML template pieces, styling, etc. that may be written by a third-party to describe rendering of various types of UI widgets. Illustrative UI widget types include a button widget type, a toggle button widget type, a segmented button widget type, a panel widget type, a container widget type, a text input widget type, a popup window widget type, a text area widget type, a check box widget type, a drop-down list widget type, a radio button group widget type that includes a plurality of radio buttons, a numeric input widget type, a message strip widget type, a button widget type, a dialog widget type, etc. Table 1 below summarizes characteristics of the illustrative widget types.

TABLE 1

| Widget Type | Description |
| --- | --- |
| Button | A general button that may have text and/or an icon. When selected, has a behavior associated with it defined by the developer. |
| Segmented button | A segmented button is a linear set of two or more segments each of which functions as a mutually exclusive button. Within the control, all segments are equal in width. Like buttons, segments can contain text and/or images. Segmented buttons are often used to display different views. In Maps, for example, a segmented button lets the user switch between Map, Transit, and Satellite views. |
| Panel | A specialized container with associated properties and information such as: title: string ~ if specified it will serve as a title which is over the content of the panel hasBorder: boolean ~ if true the panel has a border isToggleable: boolean ~ if true, the panel can be toggled open/closed to hide and show the panel content. |
| Container | A Data object model (DOM) node containing other DOM nodes with no associated styling. |

TABLE 1-continued

| Widget Type | Description |
| --- | --- |
| Text input | A text box (input box), text field or text entry box enables the user to input text information to be used by a program. A typical text box is a rectangle of any size, possibly with a border that separates the text box from the rest of the interface. Text boxes may contain zero, one, or two scrollbars. Text boxes usually display a text cursor (commonly a blinking vertical line) indicating a current region of text being edited. It is common for the mouse cursor to change its shape when it hovers over a text box. |
| Text area | Similar to a text input except it includes multiple lines/ rows of text that may have an associated label, validation criteria, such formatted as an email, and a maximum number of characters allowed. |
| Toggle button | A specialized button that has an "on" and "off" state, and accordingly an on and off look and feel that allows toggling between two states. |
| Checkbox | A box that can be checked or unchecked that has an associated onChange method that can perform any necessary actions as the result of checking or unchecking the box. |
| Dropdown List | A drop-down list that allows the user to choose one value from a list. When a drop-down list is inactive, it displays a single value. When activated, a list of values are displayed from which the user may select one. |
| Radiobutton/ Radiobutton Group | A radio button allows a user to select a single item from a predefined list of options. Radio buttons are often arranged in a group of at least two options that take the form of a hollow circle which represents a deselected state and a circle with a dot inside for a selected state. A user may choose only a single option or radio button among the set or group. |
| Message Strip | A message-strip component enables the embedding of application related messages. Each message can have a Close button, so that it can be removed from the UI, if needed. |
| Numeric Input | A text field that only accepts numeric input and may have up and down arrow buttons to move the value up or down. Keyboard arrow keys can also be used to move the value up or down, and a minimum and/or a maximum value may be associated with the text field. |
| Dialog | A dialog is a popup box on a web page. A dialog is also called a modal dialog when it obscures the rest of the page content with an overlay such that the user can no longer interact with the rest of the page content. |

For illustration, a widget library may include a class with one or more functions defined for each UI widget type that describes default behavior to render and update each UI widget type. Illustrative widget libraries include: Progress® Kendo UI for Angular®, Progress® KendoReact, Dojo Toolkit™, Javascript/jQuery UI Widgets, etc. The Progress® Kendo UI for Angular® and Progress® KendoReact were developed by and are available from Progress Software Corporation of Bedford, Mass., USA. The Dojo Toolkit™ was developed by and is available from the OpenJS Foundation of San Francisco, Calif., USA. The Javascript/jQuery UI Widgets was developed by and is available from jQWidgets of Sofia, Bulgaria.

Each widget library may be defined for use with a framework type, where each framework type defines objects with certain properties within which a behavior of specific UI widget types can be defined. The framework type defines a control flow for creation of a UI, where the UI specifics are incorporated within framework code that defines an architecture of the UI construction process. The framework type controls the UI rendering, and UI application 122 may be created based on a specific framework type. The framework type may allow a developer of UI logic components 124 to "hook into" the control flow by exposing various events and enforcing a common flow. Illustrative framework types include: Angular, jQuery®, React, AngularJS, JavaScript, etc. Angular was developed by and is available from Google, LLC of Mountain View, Calif., USA. jQuery was developed by and is available from the OpenJS Foundation of San Francisco, Calif., USA. React was developed by and is available from Meta Platforms, Inc. of Menlo Park, Calif., USA. AngularJS is available from Google, LLC of Mountain View, Calif., USA. JavaScript® is available from Pluralsight LLC of Draper, Utah, USA.

For example, UI application 122 may be created as an Angular application using the Angular framework. Agnostic widget library 126 and the one or more widget libraries 128 may be packaged with UI logic components 124 as Angular modules either alongside UI logic components 124 or as subsidiary Angular libraries that are incorporated using a package.json file. As understood by a person of skill in the art, a package.json file of an Angular application defines libraries and their version to use when creating UI application 122.

Input interface 102 provides an interface for receiving information from the user or another device for entry into UI creation device 100 as understood by those skilled in the art. Input interface 102 may interface with various input technologies including, but not limited to, a keyboard 112, a mouse 114, a display 116, a track ball, a keypad, one or more buttons, a microphone, etc. to allow the user to enter information into UI creation device 100 or to make selections presented in a UI displayed on display 116.

The same interface may support both input interface 102 and output interface 104. For example, display 116 comprising a touch screen provides a mechanism for user input and for presentation of output to the user. UI creation device 100 may have one or more input interfaces that use the same or a different input interface technology. The input interface technology further may be accessible by UI creation device 100 through communication interface 106.

Output interface 104 provides an interface for outputting information for review by a user of UI creation device 100 and/or for use by another application or device. For example, output interface 104 may interface with various output technologies including, but not limited to, display 116, a speaker 118, a printer 120, etc. UI creation device 100 may have one or more output interfaces that use the same or a different output interface technology. The output interface technology further may be accessible by UI creation device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. UI creation device 100 may have one or more communication interfaces that use the same or a different communication interface technology. For example, UI creation device 100 may support communication using an Ethernet port, a Bluetooth® antenna, a telephone jack, a USB port, etc. Data and/or messages may be transferred between UI creation device 100 and another computing device of a distributed computing system 130 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. UI creation device 100 may have one or more computer-readable media that use the same or a different memory media technology. For example, computer-readable medium 108 may include different types of computer-readable media that may be organized hierarchically to provide efficient access to the data stored therein as understood by a person of skill in the art. UI creation device 100 also may have one or more drives that support the loading of a memory media such as a CD, DVD, an external hard drive, etc. One or more external hard drives further may be connected to UI creation device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming languages, scripting languages, assembly languages, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that may be some form of RAM. UI creation device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Figure 2:
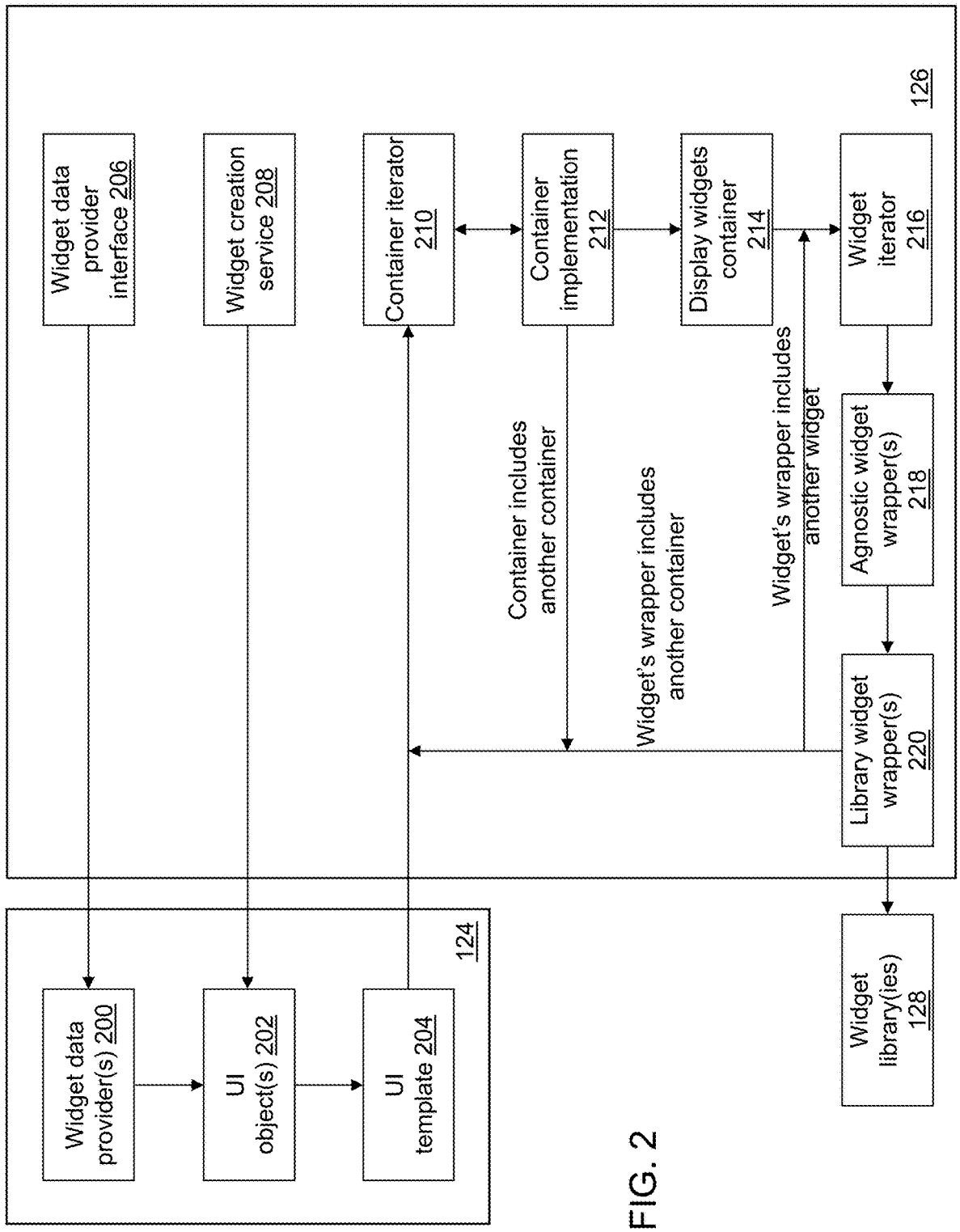
FIG. 2 depicts a block diagram of software components of the UI creation device of FIG. 1 in accordance with an illustrative embodiment.

Referring to FIG. 2, software components used to create UI application 122 are shown in accordance with an illustrative embodiment. UI application 122 may be created using, for example, the Angular development framework that is built on the Typescript® and HTML programming languages. The Typescript programming language compiles to the JavaScript programming language. The Angular framework includes a collection of libraries and can be used with various widget libraries.

According to the Angular framework, a component's application logic or how a view is managed is defined inside a class that interacts with the view through an API of properties and methods. The class is defined in the componentName.component.ts file. The component's view is defined in the componentName.component.html file, where the template is a form of HTML that tells Angular how to render the component possibly in combination with the componentName.component.css file, a componentName.component.scss file, inline in the componentName.component.ts file, etc. A CSS selector defined in the component's application logic instructs the Angular framework to create and insert an instance of the component wherever it finds the corresponding tag in HTML template code such as "selector: 'componentSelector'". A location and a name of componentName.component.html file is defined in the component's application logic using a templateUrl key or a template key that specifies the HTML for the component inline. providers: An array of service providers required by the component is defined in the component's application logic using a providers key.

UI logic components 124 may include one or more widget data providers 200, one or more UI objects 202, and a UI template 204. Agnostic widget library 126 may include a widget data provider interface 206, a widget creation service 208, a container iterator 210, a container implementation 212, a display widgets container 214, a widget iterator 216, one or more agnostic widget wrappers 218, and one or more library widget wrappers 220 that interface with the one or more widget libraries 128.

The UI developer creates UI template 204. UI template 204 may include an application definition such as <error-form-panel></error-form-panel> in an application HTML file, such as app-start.html, that is executable by a browser application. In the illustrative embodiment, the tag "error-form-panel" is an Angular tag that the browser application recognizes is not a standard HTML tag.

The tag "error-form-panel" is identified in a tag registry and used to locate and execute the associated component definition. For example, the Typescript code below stored in a file error-form-panel.component.ts uses the Angular framework to define the ErrorFormPanel UI component that includes the HTML template code or an indicator of a file that includes the HTML template code and any styles:

```
@Component({
  selector: 'error-form-panel',
  templateUrl: './error-form-panel.component.html',
  styleUrls: ['./error-form-panel.component.scss']})
export class ErrorFormPanelComponent extends
  UiTemplateContainerComponent {
  public errorFormPanel: ErrorFormPanel;
  public ngOnInit( ): void {
    this.errorFormPanel=new ErrorFormPanel( );}}
```

The UI developer creates the one or more UI objects 202. For example, the one or more UI objects 202 includes the file error-form-panel.component.ts and its associated error-form-panel.component.html as well as the ErrorFormPanel class that creates a top-level container and defines the UI details to define one or more pages to be rendered using the selected framework, the one or more widget data providers 200, the one or more UI objects 202, agnostic widget library 126, and the one or more widget libraries 128. The selected framework may also include libraries that are imported into the application and compiled or built together with UI logic components 124, agnostic widget library 126, and the one or more widget libraries 128. The one or more UI objects 202 further describe the data provider implementation of UI application 122.

For example, a content of an illustrative ErrorFormPanel class is included in Appendix A that includes a class ErrorFormPanel. A portion of Appendix A is shown below that includes the initializer newPanelComponentInitializer:

```
export class ErrorFormPanel {
  constructor(private  creationService:  creation-
    Service) { }
  public initializer;
  public createWidget( ): void {
    const creationService=this.creationService;
    const errorObject=new ErrorObject( );
    this.initializer=creationService.newPanelComponent-
      Initializer({
      title,  isOnTemplateEditorPropertiesPane:  true,
        isOpen: false,
      hasBorder: false, isToggleable: true, titleHeader:
        false,
      elements: [ . . . ] })}
```

ErrorFormPanel is a class that creates a new panel component with the defined properties that includes the widget elements included in the panel that are defined using the elements array. The identified UI object that includes the initializer for the ErrorFormPanel may be written using the Typescript programming language. For example, the UI is defined by the developer of UI application 122 in a container initializer that houses all of the widget initializers for a given portion of the displayed UI. Each of the widget initializers is created by a widget creation service of agnostic widget library 126. A widget creation service method may be defined for each widget type. For example, to define a numeric input widget type the developer of UI application 122 may include the following call to a creationService that is defined in agnostic widget library 126:

creationService.numericInput({objectKey: "expectedStatusCode", object:
  httpServiceTask, required: false, isReadonly: false,
    min: 100, max: 600});

The elements tag defines an ordered array of widget elements included in a panel widget or a container widget. A panel widget type extends a container widget type to include a title and to be toggleable. Using the elements tag any number of additional panel widgets, container widgets, or UI widget renderers can be nested based on the UI functionality defined for UI application 122. The elements array of any contained UI Widget Renderer defines an ordered array of any non-container (or panel, since it extends container) defined in the widget library. For example, a panel widget may include a container widget that further includes a UI Widget renderer which contains additional widgets having specified widget types.

For example, the illustrative ErrorFormPanel class included in Appendix A Includes an array of elements that includes a widget renderer that has its own array of elements that includes a numeric input widget and a radio button group widget. An elements array is associated with each panel/container to create one or more panel/containers and/or widget renderers associated with each panel/container where each panel/container may further include another nested panel/container with an additional one or more widget renderers and/or one or more panels/containers. Each widget renderer will contain one or more non-panel/container widgets.

elements: [
  creationService.newUiWidgetRendererComponentInitializer({isForm: true,
    className: className,

```
elements: [
    creationService.newNumericInputComponentInitial-
        izer({objectKey:
        "expectedStatusCode", object: errorObject, . . . }),
    creationService.newRadioButtonGroupComponen-
        tInitializer({objectKey:
        'stopOnFailure', object: errorObject, . . . ,
        radioButtons: [
            creationService.newRadioButtonComponent-
                nitializer({ . . . }),
            creationService.newRadioButtonComponent-
                nitializer({ . . . ,
                container: creationService.newContainerCom-
                    ponentInitializer({
                    elements: [
                    creationService.newUiWidgetRendererCompo-
                        nentInitializer({ . . . ,
                        elements: [
                        creationService.newValueDropdownCompo-
                            nentInitializer({ . . . })]
                    })]
```

If the elements array of each panel/container contains a non-panel/container widget, the elements array includes one or more constructors for a new widget renderer component initializer that will have its own elements array that includes any non-panel/container widgets. The radio button group widget includes an array of radio buttons. For example, the radio button group widget includes a first radio button widget and a second radio button widget. The second radio button widget includes a container widget with a dropdown list widget.

Figure 3:
FIG. 3 depicts a UI panel created by the software components of the UI creation device of FIG. 1 in accordance with an illustrative embodiment.

When UI application 122 is compiled and executed, for example, using a browser application, a first UI container 300 shown referring to FIG. 3 may be rendered. UI container 300 is the error form panel defined in the illustrative ErrorFormPanel class that includes a numeric input window 302 associated with the numeric input widget created by newNumericInputComponentInitializer. Element specific properties may be specified for each widget in the elements array or default property values may be used based on the widget class definition. The UI developer also specifies a UI data provider that implements a getProperty and a setProperty of the widget data provider interface as the object property with one of its properties being the objectKey. Agnostic widget library 126 defines the properties expected for each type of widget while the UI developer defines the values for the properties in UI logic components 124.

UI container 300 further includes a first radio button 304 associated with the first radio button widget and a second radio button 306 associated with the second radio button widget. Each radio button is associated with a separate newRadioButtonComponentInitializer. A dropdown list 308 included in another container defined by newContainerComponentInitializer is associated with the dropdown list widget defined using newValueDropdownComponentInitializer that is an element of the second radio button widget. Each container/panel first includes a widget renderer and then the widget elements.

The HTML template code below uses the Angular framework to define an initializer and an updater for rendering and re-rendering the ErrorFormPanel and may be located in a file named error-form-panel.component.html:

```
<wf-ui-template
    [templateUpdated]="errorFormPanel.initializer.tem-
        plateUpdated"
    [initializer]="errorFormPanel.initializer"
></wf-ui-template>
```

The component tag wf-ui-template may be registered to reference a component file, ui-template.component.ts, that defines a data object model and logic written using the typescript programming language, and an HTML template file, ui-template.component.html, that defines a view to be displayed. The component tag wf-ui-template may further include a styles file, ui-template.component.css, that defines a stylesheet for the component written using the CSS programming language (or CSS preprocessor such as Sass or Less as well as other options) and/or a testing specification file, ui-template.component.spec.ts, written using the Typescript programming language. The component tag wf-ui-template may refer to ui-template.component.ts and ui-template.component.html using a selector included in agnostic widget library 126. For example, container iterator 210 may include ui-template.component.ts and ui-template.component.html that are called whenever the tag <wf-ui-template> is encountered in HTML included in agnostic widget library 126. The initializer and templateUpdated are provided as inputs. For illustration, a content of ui-template.component.ts is provided below:

```
import {Component} from "@angular/core";
import {WorkflowNgHtmlComponent} from "../Work-
    flowNgHtmlComponent";
import {UiTemplateContainer} from "../workflow-form/
    UiTemplateProvider";
@Component({
    selector: "wf-ui-template",
    templateUrl: "./ui-template.component.html"
export class UiTemplateComponent extends
    WorkflowNgHtmlComponent<UiTemplateContainer>{
}
```

Container iterator 210 provides a widget container on display 116 with either no associated styling because it is a container widget type or with associated styling because it is a panel widget type. Customized styling can be applied by updating a class list and associating style with the class in the componentName.component.css file or other options such as those described above. For example, the HTML template code below uses the Angular framework to define container iterator 210 of agnostic widget library 126 that may be stored in ui-template.component.html:

```
<div *nglf="!initializer?.isPanel">
    <ui-template-container
        [isDisabled]="isDisabled"
        [initializer]="initializer"
        [templateUpdated]="templateUpdated"
    ></ui-template-container>
</div>
<wf-panel *nglf="initializer?.isPanel" [initializer]="ini-
    tializer">
    <span wf-panel-title>{{initializer.title}}</span>
    <span wf-panel-content>
        <ui-template-container
            [isDisabled]="isDisabled"
            [initializer]="initializer"
            [templateUpdated]="templateUpdated"
        ></ui-template-container>
    </span>
</wf-panel>
```

The code between the div tags is executed when the widget type is a container with no styling based on the test *nglf=" !initializer?.isPanel" being true, otherwise, the code between the wf-panel tags is executed for the widget type panel that includes styling based on the test *nglf= "initializer?.isPanel" being true.

As understood by a person of skill in the art, a div tag in a document that is styled with CSS, defines a division or a section in an HTML document. The div tag is used as a container for HTML elements that are styled with CSS or manipulated with JavaScript using a class or id attribute. The span tag is an inline container used to mark up a part of a document and can be also be styled with CSS or manipulated with JavaScript using the class or id attribute. The div tag is used as a block-level element, and the <span> tag is used as an inline element.

For illustration, a content of wf-panel.component.ts is provided below:

```
@Component({
  selector: "wf-panel",
  templateUrl: "./workflow-panel.component.html",
  styleUrls: ["./workflow-panel.component.scss" ],
  encapsulation: ViewEncapsulation.None})
export class WorkflowPanelComponent extends
  WorkflowHtmlComponent<Any>{
    @Input( ) public initializer: WorkflowPanelComponentInitializer;
    @Input( ) updated: string;}
```

For illustration, a content of workflow-panel.component.html is provided below:

```
<sas-panel
  [toggleable]="initializer?.isToggleable"
  [border]="initializer?.hasBorder"
  [open]="initializer?.isOpen"
  [class]="initializer?.classList"
  (toggle)="initializer?.onToggle( )"
  (contextmenu)="(false)"
  [titleHeader]="initializer?.titleHeader"
  [titleAriaLevel]="2">
    <span panel-title><ng-content select="[wf-panel-title]"></ng-content></span>
    <span panel-content><ng-content select="[wf-panel-content]"></ng-content></span>
</sas-panel>
```

For illustration, a content of WorkflowPanelComponentInitializer.ts is included in Appendix B, and a content of WorkflowContainerComponentInitializer.ts is included in Appendix C. The panel class inherits from the container class. The container class includes the functions to set and get the elements array defined by the UI developer in the one or more UI objects 202 such as that defined above for the error form panel. The UI elements array holds either panels/containers or widget renderers. There is an elements array defined for each panel/container and an elements array defined for each widget renderer. The UI elements array of a UI template container stores containers/panels and UI widget renderers. The elements array for each widget renderer stores widget initializers.

The widget creation service has an application programming interface (API) that creates all of the widget types supported by agnostic widget library 126. The widget creation service is a simple service that creates the widget initializers to make the object creation portable outside of agnostic widget library 126. The widget creation service may be written using the Typescript programming language. For example, an illustrative creationService defined in widget creation service 208 of agnostic widget library 126 is shown below:

```
@Injectable({
  providedIn: 'root'})
export class WidgetService {
  public fixed: string="fixed";
  public responsive: string="responsive";
  constructor(resourceService: ResourceService) {
    AgnosticObject.setResources(resourceService);}
  public button<dataType extends IUiWidgetDataProvider>(buttonInterface:
    IButton<dataType>): Button<dataType>{
    return new WorkflowButtonComponentInitializer
      (buttonInterface);} . . . }
```

Additional details of the illustrative creationService defined in widget creation service 208 of agnostic widget library 126 are provided in Appendix D. The widget types include: a button widget type, a toggle button widget type, a segmented button widget type, a message strip widget type, a text area widget type, a text input widget type, a checkbox widget type, a radio button widget type, a radio button group widget type, a numeric input widget type, a dialog window widget type, a dropdown list widget type, a panel widget type, a container widget type, a widget group widget type, and a popup window widget type. In alternative embodiments, a fewer or a greater number of different widget types may be included in agnostic widget library 126.

Each WidgetTypeComponentInitializer is included in agnostic widget library 126 and provides a base definition for each widget type. Widget types are rendered in either a container or a panel. Each WidgetTypeComponentInitializer may be written using the Typescript programming language.

The agnostic widget data provider, IUiWidgetDataProvider, is included in widget data provider interface 206 of agnostic widget library 126 and can be extended by the developer of UI template 204 in the one or more widget data providers 200. The agnostic widget data provider includes a getProperty and a setProperty method for each widget type and may be written using the Typescript programming language. The getProperty and setProperty methods allow the agnostic widget initializers to access and update the property on the UI data provider implementor object that is specified by the widget initializer's object and objectKey property. The agnostic widget data provider also contains a public string member className that is used to key into resource properties and obtain textual information for each widget, such as labels, help text information, etc. For example, an illustrative IUiWidgetDataProvider defined in widget data provider interface 206 of agnostic widget library 126 is shown below:

```
export interface IUiWidgetDataProvider {
  setProperty(key: keyof this, value: Any): void;
  getProperty(key: keyof this): Any;
  className: string;}
```

Each widget data provider of the one or more widget data providers 200 implements a widget data provider interface that is an object that includes the getProperty and setProperty methods and a className string member. Each widget data provider of the one or more widget data providers 200 may be written using the Typescript programming language. For example, if the object is an http service task, the widget data provider is shown below:

```
export class HttpServiceTask implements IUiWidgetDataProvider {
  public expectedStatusCode: string;
  public url: string;
  //(more service task related properties . . . )
  //implementation of the IUiWidgetDataProvider interface
  public className: string="HttpServiceTask";
  public setProperty(key: keyof this, value: any): void {
    this[key]=value;}
```

```
public getProperty(key: keyof this): any {
    return this[key];}}
```

Container implementation 212 iterates through each UI element. The component tag ui-template-container may reference a component file, ui-template-container.component.ts, that defines a data object model and logic written using the typescript programming language, an HTML template file, ui-template-container.component.html, that defines a view to be displayed, a styles file, ui-template-container.component.css, that defines a stylesheet for the component and/or a testing specification file, ui-template-container.component.spec.ts. For example, container implementation 212 may include ui-template-container.component.ts and ui-template-container.component.html that are called whenever the tag <ui-template-container> is encountered in HTML included in agnostic widget library 126. The initializer, templateUpdated, and isDisabled are provided as inputs.

For example, the Typescript code below uses the Angular framework to define container implementation 212 of agnostic widget library 126 that may be stored in ui-template-container.component.ts:

```
@Component({
    selector: "ui-template-container",
    templateUrl: "./ui-template-container.component.html"
})
export class UiTemplateContainerComponent extends
    WorkflowNgHtmlComponent<UiTemplateContainer>
    implements Oninit, OnChanges {
    @Input( ) isForm?: boolean;}
```

For example, the HTML template code below uses the Angular framework to define container implementation 212 of agnostic widget library 126 that may be stored in ui-template-container.component.html:

```
<div *ngFor="let element of initializer?.uiElements">
    <div *ngIf="element.isContainer">
        <wf-ui-template
            [isDisabled]="isDisabled"
            [initializer]="element"
            [templateUpdated]="templateUpdated"
        ></wf-ui-template>
    </div>
    <div *ngIf="!element.isContainer">
        <ui-widget-renderer
            [initializer]="element"
            [isDisabled]="isDisabled"
            [templateUpdated]="templateUpdated"
        ></ui-widget-renderer>
    </div>
</div>
```

The code iterates through each UI element. The UI elements array holds either panels/containers or widget renderers. There is an elements array defined for each panel/container and an elements array defined for each widget renderer. The UI elements array of a UI template container stores containers/panels and UI widget renderers. The elements array for each widget renderer stores widget initializers and is iterated to display the various widgets defined in UI objects 202.

When the element is a container based on the test *ngIf="element.isContainer" resulting in true, the code between the second div tags is executed. Use of the wf-ui-template tag triggers a redirect to the code defined in container iterator 210 to create another panel or container that is nested within a current container/panel being processed. When the element is not a container based on the test *ngIf="!element.isContainer" resulting in true, the code between the third div tags is executed. Use of the ui-widget-renderer tag triggers a call to the widget renderer code that creates each widget included in the group of one or more widgets defined for the current container/panel being processed.

The component tag ui-widget-renderer may reference a component file, ui-widget-renderer.component.ts, that defines a data object model and logic written using the typescript programming language, an HTML template file, ui-widget-renderer.component.html, that defines a view to be displayed, a styles file, ui-widget-renderer.component.scss, that defines a stylesheet for the component written, and/or a testing specification file, ui-widget-renderer.component.spec.ts. For example, display widgets container 214 may include ui-widget-renderer.component.ts and ui-widget-renderer.component.html that are called whenever the tag <ui-widget-renderer> is encountered in HTML included in agnostic widget library 126. The initializer, templateUpdated, and isDisabled are provided as inputs. For example, the typescript code below uses the Angular framework to define display widgets container 214 of agnostic widget library 126 that may be stored in ui-widget-renderer.component.ts:

```
@Component({
    selector: "ui-widget-renderer",
    templateUrl: "./ui-widget-renderer.component.html",
    styleUrls: ["./ui-widget-renderer.component.scss" ],
    encapsulation: ViewEncapsulation. None
})
export class UiWidgetRendererComponent extends
    WorkflowNgHtmlComponent<UiWidgetRenderer-
        ComponentInitializer>
    implements OnChanges, AfterContentinit {
    @Input( ) updated: string;
    public    ngOnChanges(changes:    SimpleChanges):
        void {
        if (this.hasChanged(changes.isDisabled)) {
            (this.initializer as any)?.form?.setDisabled(this.is-
                Disabled);
            this.initializer?.setDisabled(this.isDisabled);
}}
```

A content of an illustrative UiWidgetRendererComponentInitializer is included in Appendix E that defines methods for rendering each widget and processing the elements array. A portion of UiWidgetRendererComponentInitializer.ts is shown below:

```
export interface IUiWidgetDataProvider {
    initializeUiTemplate?(context: UiWidgetRendererCon-
        text): void;
    setProperty?(key: UiWidgetRendererKey, value: Any):
        void;
    getProperty?(key: UiWidgetRendererKey): Any;
    className: string;}
export interface IUiWidgetRendererComponentInitializer
    extends
    IWorkflowNgComponentInitializer<WorkflowForm-
        DataMap>{className?: string; . . . }
export   class    UiWidgetRendererComponentInitializer
    extends
    WorkflowNgComponentInitializer<WorkflowForm-
        DataMap,
    IUiWidgetRendererComponentInitializer> implements
    IUiWidgetRendererComponentInitializer {
    public    container:  WorkflowContainerComponentIni-
        tializer;
    public context: UiWidgetRendererContext;
    . . . ;
    constructor(initializer?:    IUiWidgetRendererCompo-
        nentInitializer) { . . . ;}
```

```
private addElementData(formData: WidgetRende-
    rInitializer): void {
  this.orderedArray.push(formData); . . . ;}
public updateTemplate( ): void {
  this.formUpdated=" "+new Dateo.getTime( );
  if (this.onUpdateTabDirty) {this.onUpdateTab-
      Dirty( );}}
get elements( ): WorkflowUiInitializerArray {return
    this._elements;}
set elements(value: WorkflowUiInitializerArray) {
  this._elements=value; . . . ;}
```

A content of an illustrative ui-widget-renderer.component.html is included in Appendix F. In the illustrative embodiment, the group of one or more widgets are rendered in display 116 as a form if the respective initializer in UI objects 202 indicates that a form is used. As understood by a person of skill in the art, the form tag is used to create an HTML form for user input. When the element is a form based on the test *ngIf="initializer?.isForm" resulting in true, the code between the form tags is executed. When the element is not a form based on the test *ngIf="!initializer?.isForm" resulting in true, the code between the div tags is executed. For illustration, the group of one or more widgets are rendered in display 116 as a form if a value of an object property such as isForm is set to true.

An orderedArray is created by the widget renderer that includes each of the widgets included in the current container. For example, the HTML template code below that may be stored in ui-widget-renderer.component.html provides additional details:

```
set elements(value: WorkflowUiInitializerArray) {
  this._elements=value;
  this.orderedArray=[ ];
  this.value=this.value||new Map<string, WidgetRen-
      dererInitializer>( );
  this.value.clear( );
  forEach(this._elements, element=>{
    this.addElementData(element);});
  const array=this.orderedArray;
  this.orderedArray=array;
  this.orderedArrayCopy=array;}
private addElementData(formData: WidgetRendererIni-
    tializer): void {
  this.orderedArray.push(formData);
  formData.widgetRenderer=this;
  this.value.set(formData.formElementid, formData);
  this.updateHelpPopup(formData);
  const value: WorkflowValue=
    UiWidgetRendererComponentInitializer.getForm-
        Data(
    formData.object,
    formData.objectKey);
  const propertyName=UiWidgetRendererComponent-
    Initializer.
      getPropertyName(formData.object, formData.ob-
          jectKey);
  extend(formData, {propertyName});
  formData.setValue(value);
  formData.setFormElementValue(formData.object.
      getProperty(formData.objectKey));
  formData.setDirtyTabOnUpdate=this.setDirtyTabOnUpdate;
  formData.onUpdateTabDirty=formData.onUpdateTabDirty||
    this.onUpdateTabDirty;
  formData.updateWorkflowVersion=
    !UiWidgetRendererTypes.isNoUpdateVersionCon-
        text(this.context);
  formData.initialized=true;}
```

Widget iterator 216 iterates through and presents each widget in the orderedArray created by the widget renderer on display 116. The component tag ui-widgets may reference a component file, ui-widget.component.ts, that defines a data object model and logic written using the typescript programming language, an HTML template file, ui-widgets.component.html, that defines a view to be displayed, a styles file, ui-widgets.component.scss, that defines a stylesheet for the component and/or a testing specification file, ui-widget.component.spec.ts. For example, widget iterator 216 may include ui-widget.component.ts and ui-widgets.component.html that are called whenever the tag <ui-widgets> is encountered in HTML included in agnostic widget library 126. The initializer, templateUpdated, and isDisabled are provided as inputs. For example, the typescript code below uses the Angular framework to define display widgets container 214 of agnostic widget library 126 that may be stored in ui-widget.component.ts:

```
@Component({
  selector: "ui-widgets",
  templateUrl: "./ui-widget.component.html",
  styleUrls: ["./ui-widget.component.scss" ],
  encapsulation: ViewEncapsulation.None})
export class UiWidgetComponent<widgetRenderer
    extends UiWidgetRendererComponentInitializer>
    extends
      WorkflowNgHtmlComponent<widgetRenderer>
    implements OnChanges, AfterContentinit {
  @Input( ) updated: string;
  public ngAfterContentInit(: void {
    this.initializer?.update( );}}
```

For example, the HTML template code below uses the Angular framework to define widget iterator 216 of agnostic widget library 126 that may be stored in ui-widget.component.html:

```
<form sasForm [class]="initializer.rtlClass">
  <div *ngFor="let formElement of initializer?.ordere-
      dArray">
    <div *ngIf="formElement.areTypesInitialized">
      <wf-popup
          class="wf-popup"
          [initializer]="formElement.helpPopup"
          *ngIf="formElement.helpPopup"
      ></wf-popup>
      <wf-text-input
          [templateUpdated]="templateUpdated"
          [class]="initializer.wfFormElementClass"
          ngIf="formElement.isTextInput"
          [initializer]="formElement"
      ></wf-text-input>
      <wf-text-area
          [templateUpdated]="templateUpdated"
          [class]="initializer.wfFormElementClass"
          ngIf="formElement.isTextArea"
          [initializer]="formElement"
      ></wf-text-area>
      <wf-checkbox
          [templateUpdated]="templateUpdated"
          [class]="initializer.wfFormElementClass"
```

```
    ngIf="formElement.isCheckbox"
    [initializer]="formElement"
></wf-checkbox>
<wf-solutions-dropdown
    [templateUpdated]="templateUpdated"
    [class]="initializer.wfFormElementClass"
    ngIf="formElement.isSolution"
    [initializer]="formElement"
></wf-solutions-dropdown>
<wf-radio-button-group
    [templateUpdated]="templateUpdated"
    [class]="initializer.wfFormElementClass"
    ngIf="formElement.isRadioButtonGroup"
    [initializer]="formElement"
    [radioButtons]="formElement.radioButtons"
></wf-radio-button-group>
<wf-numeric-input
    [templateUpdated]="templateUpdated"
    [class]="initializer.wfFormElementClass"
    ngIf="formElement.isNumericInput"
    [initializer]="formElement"
></wf-numeric-input>
<wf-value-dropdown
    [templateUpdated]="templateUpdated"
    [class]="initializer.wfFormElementClass"
    ngIf="formElement.isWorkflowValues-
      Dropdown"
    [valuesUpdated]="initializer.manager?.work-
      flowConfig?.updateTi me"
    [initializer]="formElement"
></wf-value-dropdown>
<workflow-message-strip
    ngIf="formElement.isMessageStrip"
    [initializer]="formElement"
></workflow-message-strip>
    </div>
  </div>
</form>
```

The code iterates through each widget that is associated with a formElement in the ordered array orderedArray created after reading the one or more UI objects 202 that define the orderedArray based on the elements array. The appropriate widget type is selected using the tests such as *ngIf="formElement.isNumericInput" to select a numeric input defined by the wf-numeric-input component. Each element of the orderedArray includes an initializer for the element.

Based on the widget type, an agnostic widget wrapper is selected from agnostic widget wrappers 218. Each agnostic widget wrapper included in agnostic widget wrappers 218 defines a widget library specific implementation for each of the widget libraries 128 and for each widget type included in widget iterator 216. Each agnostic widget wrapper points to a specific library implementation and defines an implementation of the widget specific library that may include any number of associated files to support the implementation. For example, the Typescript code below uses the Angular framework to define an agnostic widget wrapper of agnostic widget wrappers 218 of agnostic widget library 126 for a numeric input widget type for both the Kendo and React widget libraries:

```
@Component({
  selector: "wf-numeric-input",
  // Kendo, templateUrl points to wrapped Kendo UI
    numeric input
  templateUrl: "./workflow-numeric-input.component.h-
    tml",
  // React, template points to wrapped React numeric
    input
  //template: "<span #containerElementName></span>",
  styleUrls:    ["./workflow-numeric-input.compo-
    nent.scss" ],
  encapsulation: ViewEncapsulation.None})
export class WorkflowNumericInputComponent extends
  WorkflowHtmlComponent<WorkflowNumericInput-
    ComponentInitializer<any >>{
  @Input( ) public initializer:
    WorkflowNumericInputComponentInitializer<any>;
  public getReactElement( ) {
    this.initializer.renderAfterLabel=true;
    return  React.createElement(WfRxjsNumericInput,
      {initializer: this.initializer});}}
```

The "template" may be used to define the template for the React widget library instance of the numeric input, and the "templateUrl" may be used to provide the template for the Kendo widget library instance of the numeric input though only one can be used at a time. In the illustrative example above, the Kendo widget library instance is used so the template tag line is commented out. The template file workflow-numeric-input.component.html and any other implementation files are included as a library widgets wrapper of the one or more library widgets wrappers 220.

Agnostic widget wrappers 218 include a definition for each widget library specific implementation for each of the widget libraries 128 and for each widget type included in widget iterator 216 in the same or different files. The entries in agnostic widget wrappers 218 may refer to items in library widgets wrappers 220. For example, if the widget type is indicated to use an Angular implementation, the agnostic widget wrapper for the specific widget type includes a reference to an Angular HTML template that is ./workflow-numeric-input.component.html in the illustration above. If the widget type is indicated to use a React implementation, the agnostic widget wrapper for the specific widget type includes a reference to a .tsx file used to instantiate the React component.

For illustration, the HTML template code below uses the Angular framework and is included in the file workflow-numeric-input.component.html that is a library widget wrapper of library widget wrappers 220 of agnostic widget library 126 that points to a widget implementation that uses the Kendo library and for a numeric input widget type:

```
<sas-form-element
    [class]="initializer?.cssClassSelector"
    *ngIf="initializer?.formElementValue !==null">
  <label
      [class.required]="initializer.required"
      [for]="initializer.formElementid"
      *ngIf="initializer.propertyLabel"
      [innerHTML]="initializer.propertyLabel"
  ></label>
  <sas-number-input
      [readOnly]="initializer.isReadonly"
      [disabled]="initializer.disabled"
      [class]="initializer.classList"
      [id]="initializer.formElementid"
      [name]="initializer.formElementName"
      [(ngModel)]="initializer.formElementValue"
      [required]="initializer.isRequired"
```

```
        [min]="initializer.min"
        [max]="initializer.max"
    ></sas-number-input>
    <wf-ui-template
        class="wf-property"
        *ngIf="item. container"
        [isDisabled]="item.id !==initializer.elementValue"
        [templateUpdated]="templateUpdated"
        [initializer]="item.container"
    ></wf-ui-template>
</sas-form-element>
```

Because the Kendo library based numeric input widget type includes the component tag wf-ui-template, rendering of the Kendo library based numeric input widget type includes a nested container that triggers a redirect back to container iterator 210 to create the container associated with the numeric input widget type.

The numeric input component that wraps a React implementation is provided below:

```
import {Component, Input, ViewEncapsulation} from
    "@angular/core";
import * as React from "react";
import {WorkflowHtmlComponent} from "../../Work-
    flowHtmlComponent";
import WfRxjsNumericInput from "./WfNumericInput";
import {WorkflowNumericInputComponentInitializer}
    from
    "./WorkflowNumericInputComponentInitializer";
@Component({
    selector: "wf-numeric-input",
    //   template:   "<span   #containerElementName>
        </span>",
    templateUrl: "./workflow-numeric-input.component.h-
        tml",
    styleUrls:          ["./workflow-numeric-input.compo-
        nent.scss" ],
    encapsulation: ViewEncapsulation. None
})
export class WorkflowNumericInputComponent extends
WorkflowHtmlComponent<WorkflowNumericInput-
    ComponentInitializer<any>>
{
    @Input( ) public initializer:
WorkflowNumericInputComponentInitializer<any>;
    public getReactElement( ) {
        this.initializer.renderAfterLabel=true;
        return  React.createElement(WfRxjsNumericInput,
            {initializer:
this.initializer});
    }
}
```

The line "return React.createElement(WfRxjsNumericInput, {initializer: this.initializer});" indicates a proprietary React implementation with a React class called WfRxjsNumericInput the location of which is provided on the line "import WfRxjsNumericInput from "./WfNumericInput";" which indicates that there is a tsx file in the same directory called WfNumericInput.tsx that contains a class called WfRxjsNumericInput.

For further illustration, the Typescript code below uses JavaScript XML (JSX) syntax and is included in the file WfNumericInput.tsx that is also a library widget wrapper of library widget wrappers 220 of agnostic widget library 126 for the React library and a numeric input widget type:

```
export default class WfRxjsNumericInput extends
    WfFormElementRxjsComponent<number, any,
    WorkflowNumericInputComponentInitializer<any>,
        NumericInputProps>{
    public renderElement( ): React.ReactNode {
        return <NumericStepper
            key={this.props.initializer.formElementId}
            editMode="combo"
            minimum={this.props.initializer.min}
            maximum={this.props.initializer.max}
            className={WfFormElementRxjsComponent.
                formElementClassName}
            onChange={this.setNumericFormValue.bind(this)}
            value={this.props.initializer.elementValue}
            disabled={!!this.props.initializer.disabled}/>}
    public setNumericFormValue(event: ValueChangeEvent):
        void {
        this.props.initializer.formElementValue=event.numer-
            icValue ||0;
        this.props.initializer.elementValue=this.props.initializ-
            er.formElementValue;
        this.forceUpdate( );}}
```

The name of the React class implementation is provied on the line "export default class WfRxjsNumericInput extends WfFormElementRxjsComponent<". Because the React library based numeric input widget type does not include the component tag wf-ui-template, rendering of the React library based numeric input widget type does not include a nested container that triggers a redirect back to container iterator 210.

The one or more widget libraries 128 may include multiple layers of libraries. For example, an entity may define a particular look for its UIs by creating an intermediate library between agnostic widget library 126 and other third-party libraries that is customized to provide the particular look. An intermediate library may be created between agnostic widget library 126 and multiple third-party libraries. For example, each intermediate library of the one or more widget libraries 128 may include a particular instantiation for each widget type that is an extension of the instantiation in a third-party library. For example, the one or more widget libraries 128 may include a Kendo library numeric input widget type defined as a component using the Angular framework. The HTML template code using the Angular framework for the Kendo library numeric input widget type is shown below for illustration:

```
<kendo-numerictextbox
    [spinners]="true"
    [title]="title"
    [readonly]="readOnly ||isDisabled"
    [class.k-readonly]="readOnly"
    [class.k-state-disabled]="isDisabled"
    [(ngModel)]="inputValue"
    [min]="min"
    [max]="max"
    [step]="step"
    class="sas-form-element"
    [autoCorrect]="autoCorrect"
    [decimals]="decimals"
    [format]="format"
    placeholder="{{placeholder}}">
</kendo-numerictextbox>
<sas-form-error-icon></sas-form-error-icon>
```

For further illustration, the Typescript code that uses the JSX syntax is included in Appendix G and uses the React widget library.

Figure 4:
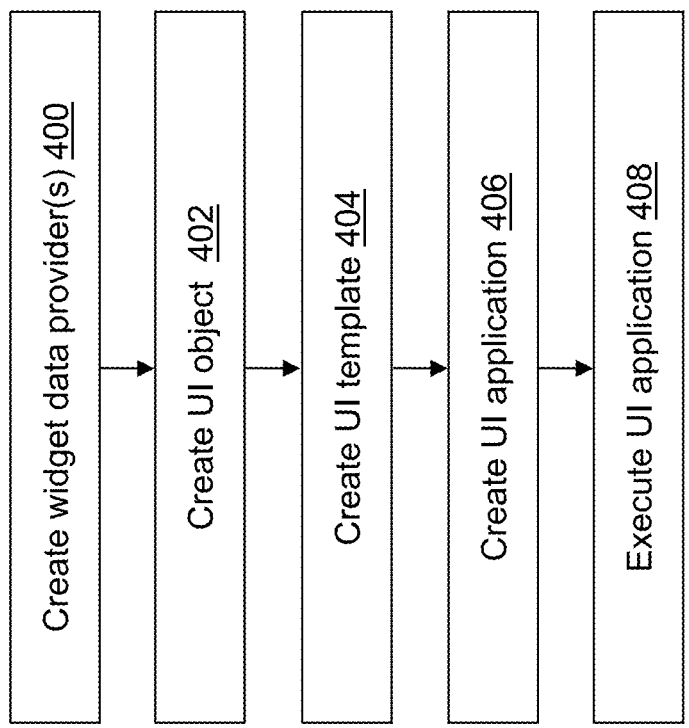
FIG. 4 depicts a flow diagram illustrating examples of operations performed by a user of the UI creation device of FIG. 1 in accordance with an illustrative embodiment.

Referring to FIG. 4, a flow diagram illustrating examples of operations performed by a user of UI creation device 100 is shown in accordance with an illustrative embodiment. In an operation 400, the widget data providers 200 are created by the UI developer for each widget included in UI objects 202.

In an operation 402, the one or more UI objects 202 are created by the UI developer to describe the UI in terms of the containers/panels and widgets through use of the elements array. The one or more UI objects 202 include a constructor for a top-level container that is either a plain container or a panel. After constructing the top-level container, the user includes the elements array that defines the widgets included in the top-level container that may include additional container/panels. Each element in the elements array may be a container/panel that includes one or more elements included on that nested container/panel or a widget. Associated with each element in the elements array is an initializer based on the type of component. The initializers may inherit from each other. For example, an agnostic object may contain resources that may be used by many or most of the initializers such as resource holders for accessing localized strings, a current user identifier, a location, etc. The user may extend the initializers to customize them for UI application 122.

In an operation 404, UI template 204 is created by the UI developer to initiate creation of the UI. For example, UI template 204 may include app-start.html which points to the registered component such as error-form-panel in the example above. The registered component points to the class definition, such as class ErrorFormPanel, included in the one or more UI objects 202.

In an operation 406, UI application 122 is created by compiling or building UI logic components 124, agnostic widget library 126, and the one or more widget libraries 128.

In an operation 408, UI application 122 is executed by a browser application. For example, app-start.html may be executed by the user to create the UI.

Figure 5A:
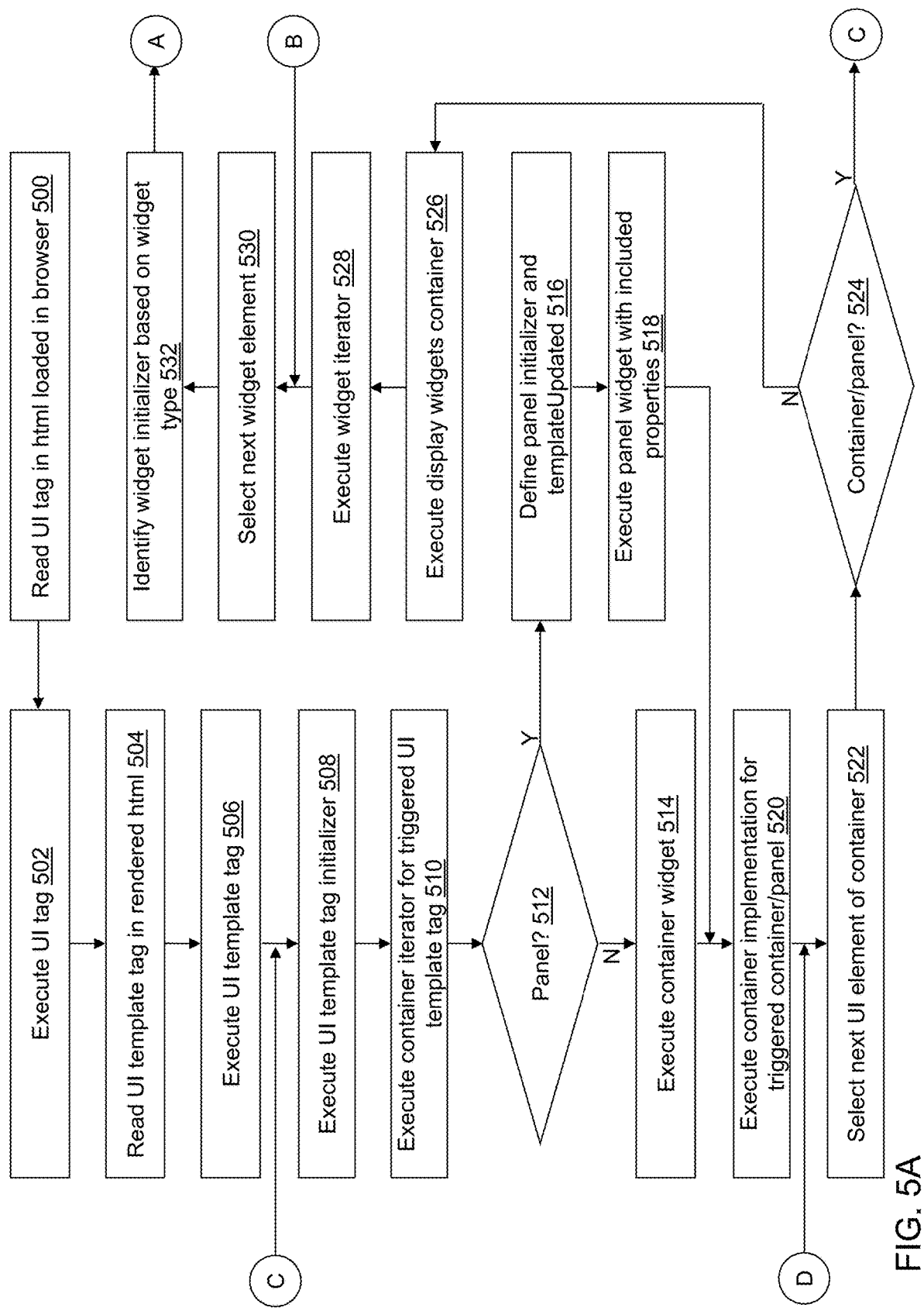
FIGS. 5A-5B depict a flow diagram illustrating examples of operations performed by the software components of the UI creation device of FIG. 1 performed while creating a UI application in accordance with an illustrative embodiment.
Figure 5B:
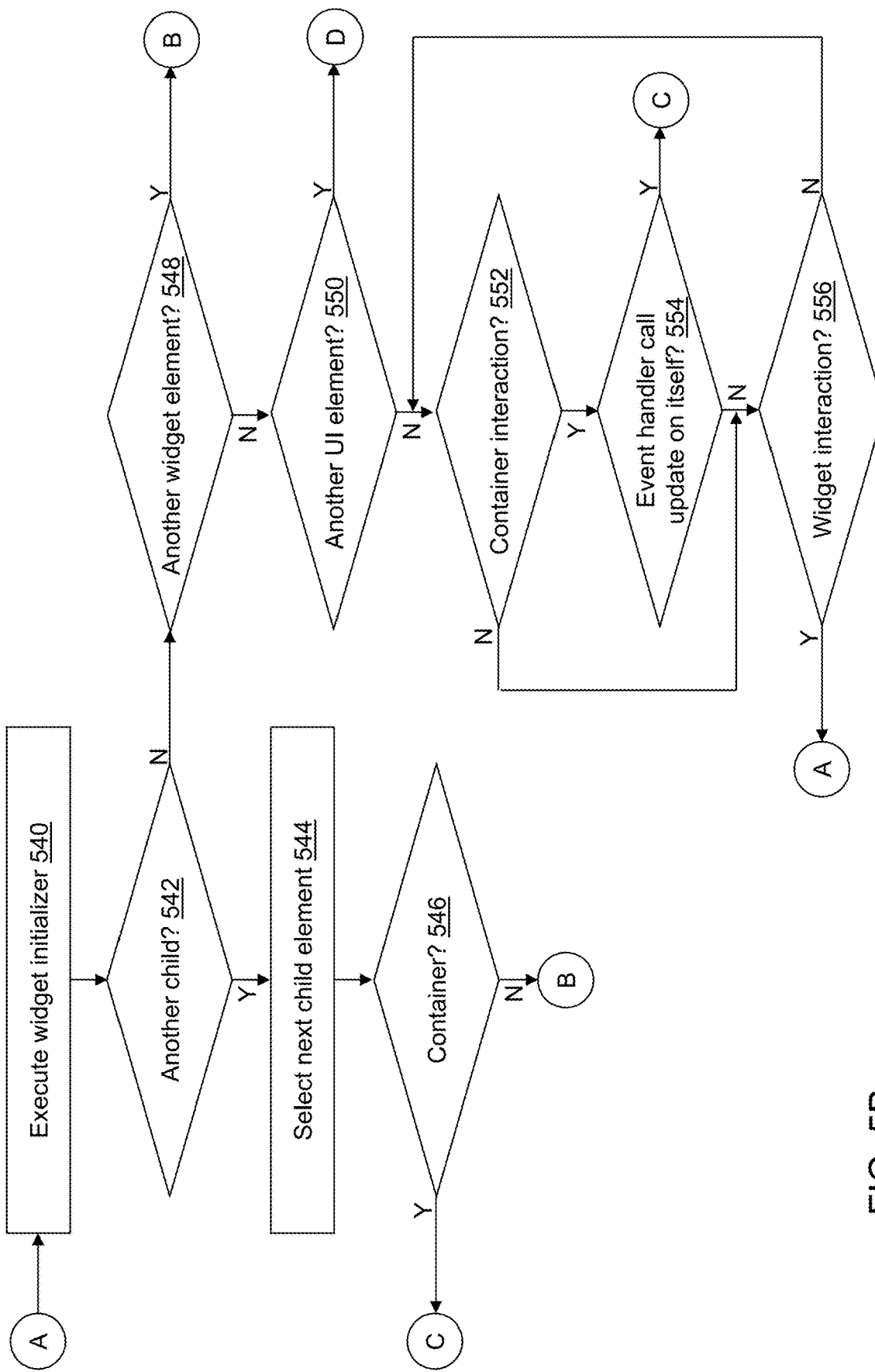

Referring to FIGS. 5A and 5B, example operations associated with creating UI application 122 from UI logic components 124 with agnostic widget library 126 are described. Additional, fewer, or different operations may be performed depending on the embodiment. The order of presentation of the operations of FIGS. 5A and 5B is not intended to be limiting. Some of the operations may not be performed in some embodiments. Although some of the operational flows are presented in sequence, the various operations may be performed in various repetitions and/or in other orders than those that are illustrated.

Referring to FIG. 5A, in an operation 500, a UI tag is read in html loaded in browser. For example, app-start.html may be executed by the browser application and may include an application definition using a UI tag such as "error-form-panel" as described above.

In an operation 502, the read UI tag is executed to trigger and render the UI by locating the associated component definition with the UI tag class definition and HTML template code identified using the templateUrl or template property in the component typescript code. The browser application recognizes that this is not a standard HTML tag and locates the tag in a tag registry. The typescript file registered for that tag is found and executed. The HTML identified in the registered typescript file is loaded. The tag typescript file either provides a template property that has the HTML embedded within the typescript itself that is loaded and executed, or provides a templateUrl property that has a reference to a file that contains the html associated with the tag that is loaded and executed. For example, the error-form-panel.component.ts is located using the UI tag and used to instantiate an instance of the ErrorFormPanel class that defines the top-level container and the elements array and points to error-form-panel.component.html.

An elements array is instantiated immediately before the UI or the portion of the UI is shown on display 116. A creation service is also created to create elements and pass them back to a caller when the element is asked for. A widget data provider may be created at any point in time prior to the container being shown that includes the widget. As the developer defines their elements array, they relate an existing data provider "object" to the container/widget renderer which they are creating using the object and objectKey properties to specify the data provider "object"; The "objectKey" points to one of the properties of the object that will both provide the data for the current widget, and the current widget will in turn (potentially) update that data point. So, just before the container appears on screen, the property from the object is read, and is written/updated if/when the user interacts with the widget to change the object's property value.

When rendering the DOM, the containers/widgets are instantiated when they appear on display 116. The technology-specific library (KendoUI, React) container/widget is instantiated as the ui-template is shown on display 116 in the same order as defined in the elements arrays. For example, the trigger and render process of the ui-template tag triggers and renders the wf-numeric-input that triggers and renders the technology specific widget.

In an operation 504, a UI template tag is read in the html rendered based on the read UI tag. For example, the HTML template code in error-form-panel.component.html may include the UI template tag "wf-ui-template" that includes an initializer property binding and a templateUpdated property binding.

In an operation 506, the read UI template tag is executed to trigger and render the UI template by locating the associated component definition For example, the component tag wf-ui-template may be registered to reference the component file, ui-template.component.ts.

In an operation 508, the initializer defined for the read UI template tag, such as "errorFormPanel.initializer", is executed by locating the associated initializer component definition. For example, the ErrorFormPanel.initializer in the one or more UI objects 202 is identified and read.

In an operation 510, container iterator 210 is executed and the initializer and the template Updated for the container currently being processed are passed to the container iterator 210 as inputs. For example, on a first iteration, container iterator 210 is passed the initializer and the template Updated defined in operation 508 and is executed to create the container defined by the initializer.

In an operation 512, a determination is made by container iterator 210 concerning whether the current container is a panel. When the current container is a panel, processing continues in an operation 516. When the current container is not a panel, processing continues in an operation 514. For example, the initializer associated with the read UI template tag indicates whether the container is a panel that has styles and is toggleable or is a plain container.

In operation 514, the container widget is executed to trigger and render the plain container with the current container initializer, and processing continues in operation 520.

In operation 516, the panel and the templateUpdated are defined for the current container initializer.

In an operation 518, the panel widget is executed to trigger and render the panel with the properties included with the current panel initializer. For example, container iterator 210 of agnostic widget library 126 that may be stored in ui-template.component.html is executed in operation 510 that results in performance of operations 512 through 518 based on the test *ngIf="" !initializer?.isPanel or *ngIf="initializer?.isPanel which is the determination in operation 512.

In an operation 520, container implementation 212 is passed the initializer and the template Updated for the current container and is executed to begin processing the container elements defined by the initializer. For example, the template container is triggered and rendered based on the ui-template-container tag defined for the panel/container in container iterator 210 of agnostic widget library 126. For example, a processing loop is started based on the statement <div *ngFor="let element of initializer?.uiElements"> included in the ui-template-container.component.html.

In an operation 522, a next UI element, element, of the UI elements of the selected container is selected. On a first iteration, the first element of the container is selected; on a second iteration, a second element of the container is selected, and so on. For example, the UI elements array is processed that may include either another panel/container and/or widget renderers as described above.

In an operation 524, a determination is made concerning whether the selected next UI element is a container/panel. When the selected next UI element is a container/panel, processing continues in operation 508 to process the selected next UI element that is a container/panel container and its widgets. When the selected next UI element is not a container, processing continues in an operation 526.

The initializer and the template Updated for the selected next UI element is passed to container iterator 210. When the selected next UI element is not a container, the element in the elements array associated with the selected next UI element includes a widget renderer instead of a container/panel. For example, container implementation 212 of agnostic widget library 126 that may be stored in ui-template-container.component.ts is executed in operation 520 that results in performance of operations 522 through 524 based on the test *ngIf="element.isContainer" that returns to operation 508 based on inclusion of the tag wf-ui-template or *ngIf="" !element.isContainer" that triggers and renders widgets based on inclusion of the tag ui-widget-renderer in operation 526.

In operation 526, display widgets container implementation 214 is passed the initializer and the template Updated for the selected next UI element and is executed. If an isForm property is set to true on the widget renderer, the test for *ngIf="initializer?.isForm" is true and the widgets are displayed in a form. otherwise, the widgets are displayed as a plain HTML div with no form associated styling, blocks, validation, etc. For example, the component tag ui-widget-renderer that may reference a component file, ui-widget-renderer.component.ts that references ui-widget-renderer.component HTML is executed.

In an operation 528, widget iterator 216 is passed the initializer and the template Updated for the selected next UI element and is executed to iterate through each widget defined in the elements array for the selected next UI element. For example, the component tag ui-widgets that may reference a component file, ui-widget.component.ts that references ui-widgets.component HTML is executed. For example, a processing loop is started based on the statement <div *ngFor="let formElement of initializer?.orderedArray"> included in the ui-widgets.component.html.

In an operation 530, a next widget element of the orderedArray defined for selected next UI element is selected. On a first iteration, the first element of the orderedArray is selected; on a second iteration, a second element of the orderedArray is selected, and so on. A method called copy may set the 'elements' property provided as a property of the UiWidgetRendererComponentInitializer. This property is set on the UiWidgetRendererComponentInitializer by calling the "set elements" method that uses the widgets provided in "a bunch of widget elements" to create the orderedArray within that method. The elements may be provided as an argument to the constructor, and the elements property set.

In an operation 532, a widget tag initializer and the template Updated is identified for the selected next widget element, and processing continues in an operation 540, shown referring to FIG. 5B. For example, the successive tests are applied until a matching widget type is identified that includes an initializer. For example, *ngIf="formElement.isNumericInput" is selected when the widget type is a numeric input.

In operation 540, the widget tag initializer is executed to trigger and render the widget by populating the agnostic widget wrapper of the agnostic widget wrappers 218. The agnostic widget wrapper then populates a library widget wrapper of the library widget wrappers 220 based on which implementation is indicated when more than one implementation is supported by the library widget wrappers 220. The library widget wrapper then populates a widget of the one or more widget libraries 128 to render the widget.

In an operation 542, a determination is made concerning whether the selected next widget element has another child. When the selected next widget element has another child, processing continues in an operation 544. When the selected next widget element does not have any or another child, processing continues in an operation 548. For example, the agnostic widget wrapper and/or the library widget wrapper may include a container/panel through use of the wf-ui-template tag or another widget.

For example, within a widget's HTML, any other widget(s) used as a building block for the selected next widget element are defined using an embedded widget tag within the widget's HTML included in library widget wrappers 220. For example, a dialog widget may include a button widget. As a result, in the dialog widget HTML, a <wf-button> tag is included to define the child widget.

As another example, within the widget's HTML, any other container(s) used as a building block for the selected next widget element are defined using the <wf-ui-template> tag within the widget's HTML included in library widget wrappers 220. For example, in the error form panel described above, the radio button group includes a container associated with the second radio button that contains a dropdown widget that is a child container of the radio button group.

In operation 544, a next child element of the selected next widget element is selected.

In an operation 546, a determination is made concerning whether the selected next child element is a container. When the selected next child element is a container, processing continues in operation 508 to process the child elements that is a container. When the selected next child element is not a container, processing continues in operation 530 to select a next child widget element of the selected next child element. The initializer and the template Updated selected next child element is passed to the appropriate component.

In operation 548, a determination is made concerning whether there is another widget element included in the orderedArray for the current container. When there is another widget element included in the ordered array for the current container, processing continues in operation 530. When there is not another widget element included in the orderedArray for the current container, processing continues in an operation 550.

In operation 550, a determination is made concerning whether there is another UI element defined for the current container. When there is another UI element included defined for the current container, processing continues in operation 522. When there is not another UI element included defined for the current container, processing continues in an operation 552.

In operation 552, rendering of the HTML loaded in the browser application is done so a determination is made concerning whether there is an interaction with a container of the loaded HTML. When there is an interaction with a container, processing continues in an operation 554. When there is not an interaction with a container, processing continues in an operation 556.

In operation 554, a determination is made concerning whether an event handler of the container calls an update on itself. When the event handler of the container calls an update on itself, processing continues in operation 512. When the event handler of the container does not call an update on itself, processing continues in operation 556. An event handler is a method provided for a widget or container/panel that is called for that widget based on a specific user interaction. For example, an onClick method is called when a user clicks a button, an onToggle method is called when a user toggles a Panel open or closed, an onChange method is called when a user types in a text input, etc.

A templateUpdated binding indicates a need to re-render a widget or container/panel. For example, a radio button change within a radio button group enable or disables its child container(s). When this happens, instead of re-rendering the entire page, the templateUpdated binding is updated and triggered only for the portion of the page that needs re-rendering. For example, when a radio button of the radio button group is selected, the containers associated with the other unchosen radio buttons are rerendered so that they are disabled. In the onChange event handler for the radio button group, the updateTemplateo method on the radio button group widget is called, which changes the value of the radio button group templateUpdated property. By passing the radio button group templateUpdated property to the embedded containers, only the containers associated with the radio button group are updated instead of the entire form/application.

In operation 556, a determination is made concerning whether there is an interaction with a widget of the loaded HTML. When there is an interaction with a widget, processing continues in operation 540. When there is not an interaction with a widget, processing continues in operation 552 to await an interaction.

The typical approach when using a framework to create an HTML application has been to write separate HTML templates for each page resulting in tightly coupled frameworks and widget libraries with proprietary business logic included within these structures that describes the data model and the UI appearance. Eventually, HTML technologies change requiring a rewrite and/or a refactorization of the application which results in significant wasted development resources and the introduction of errors. Time is wasted updating to use the new HTML technology instead of incorporating new features.

Use of agnostic widget library 126 decouples the data model and the UI appearance defined by UI logic components 124 from the one or more widget libraries 128 significantly reducing the time required to incorporate use of a new HTML technology, reducing the likelihood of developer error, and promoting a higher level of consistency in UI rendering. Less testing and optimization are required when incorporating use of the new HTML technology because the changes are isolated in the one or more agnostic widget wrappers 218 and the one or more library widget wrappers 220. Creation of UI application 122 based on agnostic widget library 126 also provides support for use of multiple HTML widget libraries in the one or more widget libraries 128 without changing UI logic components 124 so that some widgets can be supported by one widget library while others are supported by a different widget library providing maximum flexibility for the UI developer.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:

read a user interface (UI) tag in a UI application, wherein the UI tag identifies a typescript file and hypertext markup language code associated with the typescript file that includes a reference to an initializer for the UI application, wherein the typescript file includes second computer readable instructions written using the typescript programming language, wherein the second computer readable instructions are included in the computer readable instructions;

execute the UI tag to identify a UI template tag;

execute the identified UI template tag to define a top-level container initializer for the UI application and to define a plurality of widget initializers for inclusion in a top-level container rendered using the top-level container initializer, wherein the UI template tag identifies a template typescript file and template hypertext markup language code associated with the template typescript file that includes a template reference to the top-level container initializer for the UI application, wherein the template typescript file includes third computer readable instructions written using the typescript programming language, wherein the third computer readable instructions are included in the computer readable instructions;

render the top-level container in a display using the top-level container initializer; and render each widget of a plurality of widgets in the rendered top-level container using the defined plurality of widget initializers to create a UI.

2. The non-transitory computer-readable medium of claim 1, wherein each widget of the plurality of widgets is rendered in the order defined in the UI template tag.

3. The non-transitory computer-readable medium of claim 1, wherein the typescript file is configured to instantiate a class that describes the top-level container and the plurality of widgets.

4. The non-transitory computer-readable medium of claim 1, wherein the top-level container initializer indicates that the top-level container is toggleable.

5. The non-transitory computer-readable medium of claim 1, wherein the top-level container initializer indicates that the top-level container is not toggleable.

6. The non-transitory computer-readable medium of claim 1, wherein the top-level container initializer indicates that the top-level container has a title.

7. The non-transitory computer-readable medium of claim 1, wherein each widget initializer of the plurality of widget initializers indicates a type of widget.

8. The non-transitory computer-readable medium of claim 7, wherein the type of widget is selected from the group consisting of a button widget type, a toggle button widget type, a segmented button widget type, a text input widget type, a popup window widget type, a text area widget type, a check box widget type, a drop-down list widget type, a radio button group widget type, radio button widget type, a numeric input widget type, a message strip widget type, a button widget type, and a dialog widget type.

9. The non-transitory computer-readable medium of claim 7, wherein rendering each widget of the plurality of widgets comprises populating a widget wrapper associated with the type of widget using a widget tag.

10. The non-transitory computer-readable medium of claim 9, wherein the widget wrapper includes a pointer to a library widget wrapper associated with the type of widget.

11. The non-transitory computer-readable medium of claim 10, wherein the library widget wrapper defines a framework specific implementation of the widget.

12. The non-transitory computer-readable medium of claim 11, wherein the framework specific implementation of the widget defines a second container initializer, wherein a second container is rendered after rendering the widget using the second container initializer.

13. The non-transitory computer-readable medium of claim 12, wherein the framework specific implementation of the widget further defines a second plurality of widget initializers for inclusion in the second container, wherein each widget of the second plurality of widgets is rendered in the rendered second container using a respective widget initializer of the defined second plurality of widget initializers.

14. The non-transitory computer-readable medium of claim 11, wherein the framework specific implementation of the widget defines a second widget initializer for inclusion in the top-level container with the widget, wherein a second widget is rendered in the rendered top-level container using the second widget initializer.

15. The non-transitory computer-readable medium of claim 1, wherein executing the identified UI template tag further defines a second container initializer nested in the top-level container initializer, wherein a second container is rendered after rendering the top-level container using the second container initializer.

16. The non-transitory computer-readable medium of claim 15, wherein executing the identified UI template tag further defines a second plurality of widget initializers for inclusion in the second container, wherein each widget of the second plurality of widgets is rendered in the rendered second container using a respective widget initializer of the defined second plurality of widget initializers.

17. The non-transitory computer-readable medium of claim 1, wherein a widget initializer of the plurality of widget initializers includes a second container initializer, wherein a second container is rendered after rendering a widget associated with the widget initializer using the second container initializer.

18. The non-transitory computer-readable medium of claim 17, wherein executing the identified UI template tag further defines a second plurality of widget initializers for inclusion in the second container, wherein, after rendering the second container, each widget of the second plurality of widgets is rendered in the rendered second container using a respective widget initializer of the defined second plurality of widget initializers.

19. A computing device comprising:
a processor; and
a non-transitory computer-readable medium operably coupled to the processor, the computer-readable medium having computer-readable instructions stored thereon that, when executed by the processor, cause the computing device to
read a user interface (UI) tag in a UI application, wherein the UI tag identifies a typescript file and hypertext markup language code associated with the typescript file that includes a reference to an initializer for the UI application, wherein the typescript file includes second computer readable instructions written using the typescript programming language, wherein the second computer readable instructions are included in the computer readable instructions;
execute the UI tag to identify a UI template tag;
execute the identified UI template tag to define a top-level container initializer for the UI application and to define a plurality of widget initializers for inclusion in a top-level container rendered using the top-level container initializer, wherein the UI template tag identifies a template typescript file and template hypertext markup language code associated with the template typescript file that includes a template reference to the top-level container initializer for the UI application, wherein the template typescript file includes third computer readable instructions written using the typescript programming language, wherein the third computer readable instructions are included in the computer readable instructions;
render the top-level container in a display using the top-level container initializer; and
render each widget of a plurality of widgets in the rendered top-level container using the defined plurality of widget initializers to create a UI.

20. A method of creating a user interface application, the method comprising:
reading, by a computing device, a user interface (UI) tag in a UI application, wherein the UI tag identifies a typescript file and hypertext markup language code associated with the typescript file that includes a reference to an initializer for the UI application, wherein the typescript file includes second computer readable instructions written using the typescript programming language, wherein the second computer readable instructions are included in the computer readable instructions;

executing, by the computing device, the UI tag to identify a UI template tag;

executing, by the computing device, the identified UI template tag to define a top-level container initializer for the UI application and to define a plurality of widget initializers for inclusion in a top-level container rendered using the top-level container initializer, wherein the UI template tag identifies a template typescript file and template hypertext markup language code associated with the template typescript file that includes a template reference to the top-level container initializer for the UI application, wherein the template typescript file includes third computer readable instructions written using the typescript programming language, wherein the third computer readable instructions are included in the computer readable instructions;

rendering, by the computing device, the top-level container in a display using the top-level container initializer; and rendering, by the computing device, each widget of a plurality of widgets in the rendered top-level container using the defined plurality of widget initializers to create a UI.

21. The method of claim 20, wherein each widget of the plurality of widgets is rendered in the order defined in the UI template tag.

22. The method of claim 20, wherein the typescript file is configured to instantiate a class that describes the top-level container and the plurality of widgets.

23. The method of claim 20, wherein each widget initializer of the plurality of widget initializers indicates a type of widget.

24. The method of claim 23, wherein rendering each widget of the plurality of widgets comprises populating a widget wrapper associated with the type of widget using a widget tag.

25. The method of claim 24, wherein the widget wrapper includes a pointer to a library widget wrapper associated with the type of widget.

26. The method of claim 25, wherein the library widget wrapper defines a framework specific implementation of the widget.

27. The method of claim 26, wherein the framework specific implementation of the widget defines a second container initializer, wherein a second container is rendered after rendering the widget using the second container initializer.

28. The method of claim 27, wherein the framework specific implementation of the widget further defines a second plurality of widget initializers for inclusion in the second container, wherein each widget of the second plurality of widgets is rendered in the rendered second container using a respective widget initializer of the defined second plurality of widget initializers.

29. The method of claim 26, wherein the framework specific implementation of the widget defines a second widget initializer for inclusion in the top-level container with the widget, wherein a second widget is rendered in the rendered top-level container using the second widget initializer.

30. The method of claim 20, wherein executing the identified UI template tag further defines a second container initializer nested in the top-level container initializer, wherein a second container is rendered after rendering the top-level container using the second container initializer.

* * * * *